United States Patent
Chiu

(10) Patent No.: US 8,209,478 B2
(45) Date of Patent: Jun. 26, 2012

(54) SINGLE-PORT SRAM AND METHOD OF ACCESSING THE SAME

(75) Inventor: Chun-Yu Chiu, Tainan (TW)

(73) Assignee: Himax Technologies Limited, Tainan County (TW)

(*) Notice: Subject to any disclaimer, the term of this patent is extended or adjusted under 35 U.S.C. 154(b) by 714 days.

(21) Appl. No.: 12/397,269

(22) Filed: Mar. 3, 2009

(65) Prior Publication Data
US 2010/0228910 A1  Sep. 9, 2010

(51) Int. Cl.
*G06F 12/00* (2006.01)
(52) U.S. Cl. ..... 711/104; 711/5; 711/167; 711/E12.002; 365/233.16
(58) Field of Classification Search ............. None
See application file for complete search history.

(56) References Cited

U.S. PATENT DOCUMENTS

| | | | | |
|---|---|---|---|---|
| 4,777,485 A * | 10/1988 | Costello | ........................ | 345/572 |
| 6,144,604 A * | 11/2000 | Haller et al. | .................. | 365/221 |
| 6,195,721 B1 * | 2/2001 | Rice | .............................. | 710/310 |
| 6,933,915 B2 * | 8/2005 | Hidaka et al. | ................... | 345/98 |

* cited by examiner

*Primary Examiner* — Yaima Campos
*Assistant Examiner* — Thanh D Vo
(74) *Attorney, Agent, or Firm* — Stout, Uxa, Buyan & Mullins, LLP

(57) ABSTRACT

A system and method for resolving request collision in a single-port static random access memory (SRAM) are disclosed. A first SRAM part and a second SRAM part of the single-port SRAM are accessed in turn. When request collision occurs, data is temporarily stored in a first or second shadow bank associated with the first or the second SRAM part which is under access. The temporarily stored data is then transferred, at a later time, to an associated one of the first/second SRAM parts while the other one of the first/second SRAM parts is being accessed.

7 Claims, 6 Drawing Sheets

SINGLE-PORT SRAM AND METHOD OF ACCESSING THE SAME

BACKGROUND OF THE INVENTION

1. Field of the Invention

The present invention generally relates to a static random access memory (SRAM), and more particularly to a system and method for resolving request collision in a single-port SRAM.

2. Description of the Prior Art

Static random access memory (SRAM) is a type of semiconductor memory that is faster than dynamic random access memory (DRAM), which needs to be periodically refreshed. Accordingly, the SRAM is usually used as video memory in the driver of a panel display such as a liquid crystal display (LCD). The SRAM can be categorized as a single-port SRAM or a multi-port SRAM. The former has only one read/write port, while the latter has two or more read/write ports that can be accessed by various requesters at the same time. As the multi-port SRAM needs larger chip area and consumes more power than the single-port SRAM, the single-port SRAM is preferably used in portable or handheld electronic devices, such as mobile phones.

However, the high-capacity and low-power single-port SRAM suffers a speed penalty when two (or more) requests collide, or, in other words, the requests occur within the same clock cycle. FIG. 1A shows an exemplary timing diagram illustrating the request collision in a conventional single-port SRAM. In the figure, a host sends external requests EXT_REQUEST to write data (that is, Data 1, Data 2, Data 3 and Data 4 in the figure) in sequence to the single-port SRAM during respective cycles (that is, cycle 1, cycle 2, cycle 3 and cycle 4). Unfortunately, an internal request INT_RD also demands data during the same cycle 1. In other words, the internal request collides with the external request about the Data 1. In order to resolve this problem, the sequencer of the SRAM provides adjusted timing as shown in FIG. 1B, in which the signal RAM_CLK is derived from the external request EXT_REQUEST, and the signal RAM_LE is derived from the internal request INT_RD. After the Data 1 has been written to the SRAM in cycle 1, the next cycle (that is, cycle 2) is reserved for use of the internal request. While the external request about the Data 2 is postponed until the following cycle (that is, cycle 3), all of the other external requests about the Data 3 and the Data 4 are also, respectively, postponed by one cycle.

Although the request collision can be solved by delaying all of the following requests for one cycle as discussed above, the conventional single-port SRAM disadvantageously suffers from a speed penalty (i.e., one-cycle postponement whenever request collision occurs). For that reason, a need has arisen to propose a novel single-port SRAM architecture and method with improved speed performance.

SUMMARY OF THE INVENTION

In view of the foregoing, it is an object of the present invention to provide a system and method that requires no postponement cycle when request collision occurs (requests collide) in a single-port SRAM, accordingly improving speed performance while maintaining high capacity and low power consumption.

According to one embodiment, the single-port SRAM includes a first SRAM part and a second SRAM part, which are accessed in turn. The single-port SRAM further includes a first shadow bank associated with the first SRAM part, and a second shadow bank associated with the second SRAM part, each for temporarily storing at least one piece of data and address. A SRAM controller is used to generate control signals for managing flow of data going to and from the single-port SRAM. A sequencer of the SRAM derives sequence signals based on the control signals of the SRAM controller, and accordingly controls the first/second SRAM parts and the first/second shadow banks in a timed fashion. A first bus is provided for communicating the sequencer with the first SRAM part and the first shadow bank, and a second bus is provided for communicating the sequencer with the second SRAM part and the second shadow bank. According to the embodiment, data is temporarily stored in the first or the second shadow bank associated with the first or the second SRAM part under access when request collision occurs. The temporarily stored data is then transferred, at a later time, to an associated one of the first/second SRAM parts while the other one of the first/second SRAM parts is being accessed.

DETAILED DESCRIPTION OF THE INVENTION

Figure 2:
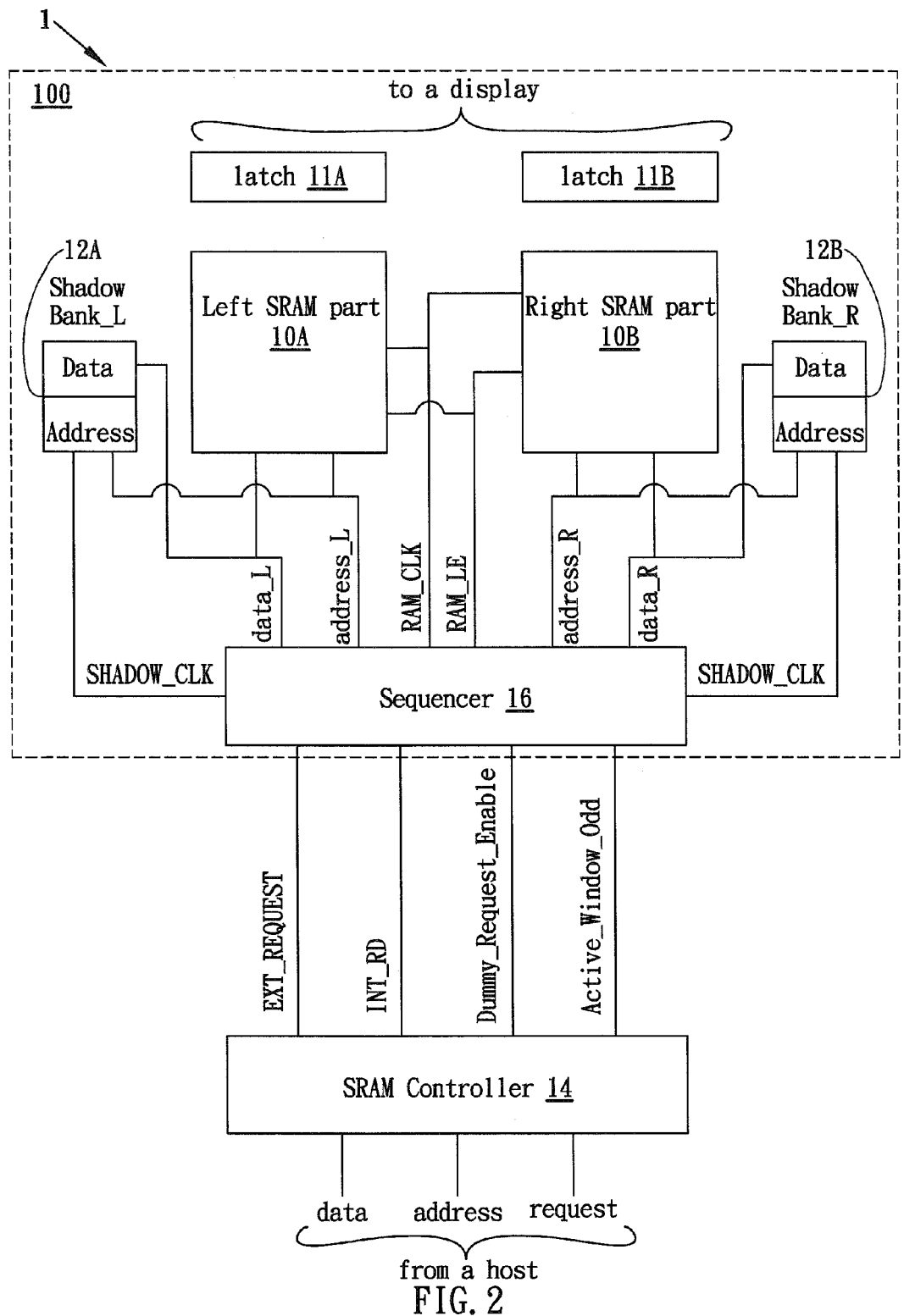
FIG. 2 shows a block diagram illustrating a system for resolving request collision in a single-port static random access memory (SRAM) according to one embodiment of the present invention.

FIG. 2 shows a block diagram illustrating a system 1 for resolving request collision in a single-port static random access memory (SRAM) 100 according to one embodiment of the present invention. While the system 1 is adapted to the driver of a panel display (such as an LCD) in a portable or handheld electronic device (such as a mobile phone), it is appreciated that the disclosed system 1 can be well adapted to other electronic devices.

The SRAM 100 is ordinarily partitioned into two parts: a first (left) SRAM part 10A and a second (right) SRAM part 10B. A logic control circuit (not shown) is usually arranged between the parts (10A and 10B) for the purpose of achieving better timing. Each part 10A/10B usually includes one or more banks. It is noted that, in the embodiment, the first SRAM part 10A and the second SRAM part 10B are accessed in turn. For example, the first data is written to the first SRAM part 10A, followed by writing the second data to the second SRAM part 10B. Subsequently, the third data is again written to the first SRAM part 10A, followed by writing the fourth data to the second SRAM part 10B. In the embodiment, a first (left) shadow bank 12A is associated with the first SRAM part 10A, and a second (right) shadow bank 12B is associated with the second SRAM part 10B. Specifically, the first shadow bank 12A has storage space for temporarily storing at least one piece of data and address, and the second shadow bank 12B also has a similar storage space.

In the architecture of the system 1, a SRAM controller 14 is utilized to manage the flow of data going to and from the SRAM 100. For example, the SRAM controller 14 may communicate with the host of a mobile phone through, among others, data lines, address lines and (external) request input. The SRAM controller 14 accordingly generates some control signals, which are then forwarded to a sequencer 16 of the SRAM 100. For example, when the host sends an external request to write data to the SRAM 100, the SRAM controller 14 will accordingly generate an external request EXT_REQUEST. Whenever the display demands display data, an internal request INT_RD will be issued and input to the sequencer 16. The signals Dummy_Request_Enable and Active_Window_Odd will be discussed later in this specification.

Afterwards, the sequencer 16 generates some sequence signals to control the first/second SRAM parts 10A/10B and the first/second shadow banks 12A/12B in a timed fashion based on the generated control signals of the SRAM controller 14. Among the generated sequence signals, the signal RAM_CLK is derived from the external request EXT_REQUEST, and the signal RAM_LE is derived from the internal request INT_RD. The signal SHADOW_CLK is used to provide timing to the first/second shadow banks 12A/12B.

The first SRAM part/shadow bank 10A/12A and the second SRAM part/shadow bank 10B/12B are communicated with the sequencer 16 via first bus (address_L and data_L) and second bus (address_R and data_R), respectively. The first SRAM part 10A and the second SRAM part 10B, respectively, have their own address decoders (not shown).

The SRAM 100 further includes latches 11A and 11B associated with the first SRAM part 10A and the second SRAM part 10B, respectively. The latches 11A/11B are used to read and store a whole line of display data from the first/second SRAM parts 10A/10B, when an internal request INT_RD is issued from the host.

Figure 1A:
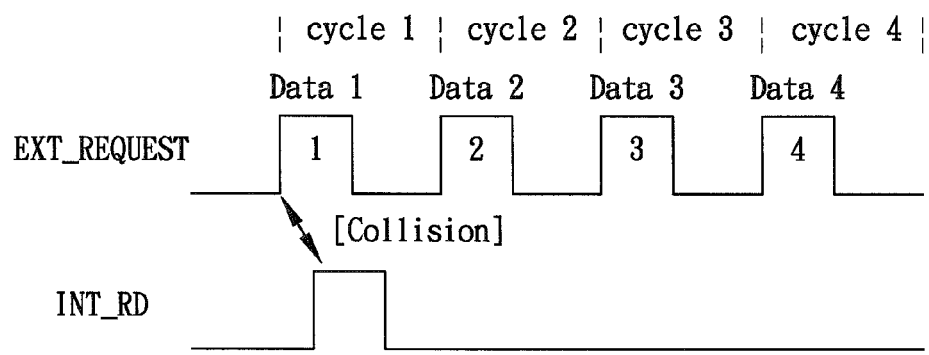
FIG. 1A shows an exemplary timing diagram illustrating request collision in a conventional single-port SRAM.
Figure 1B:
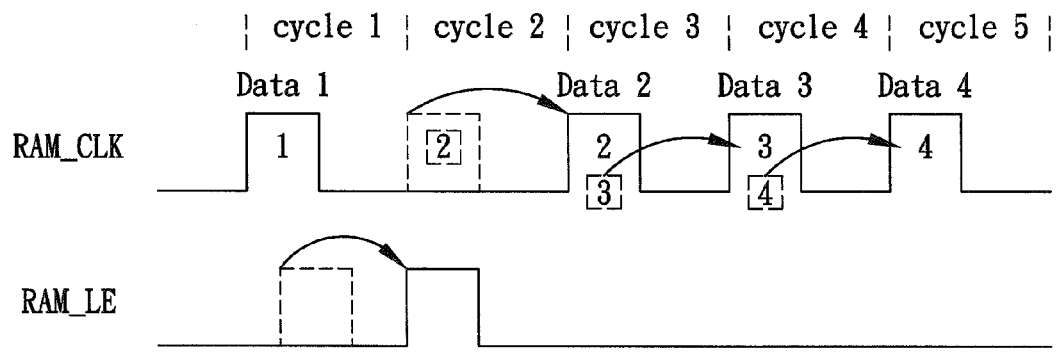
FIG. 1B shows an adjusted timing diagram for conventionally solving the request collision exemplified in FIG. 1A.
Figure 3A:
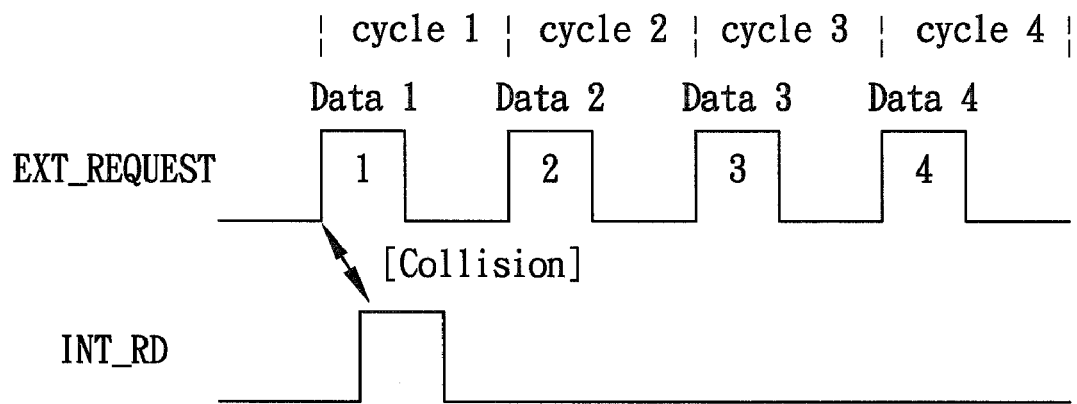
FIG. 3A shows an exemplary timing diagram illustrating a first case of request collision in the SRAM of the embodiment.
Figure 3B:
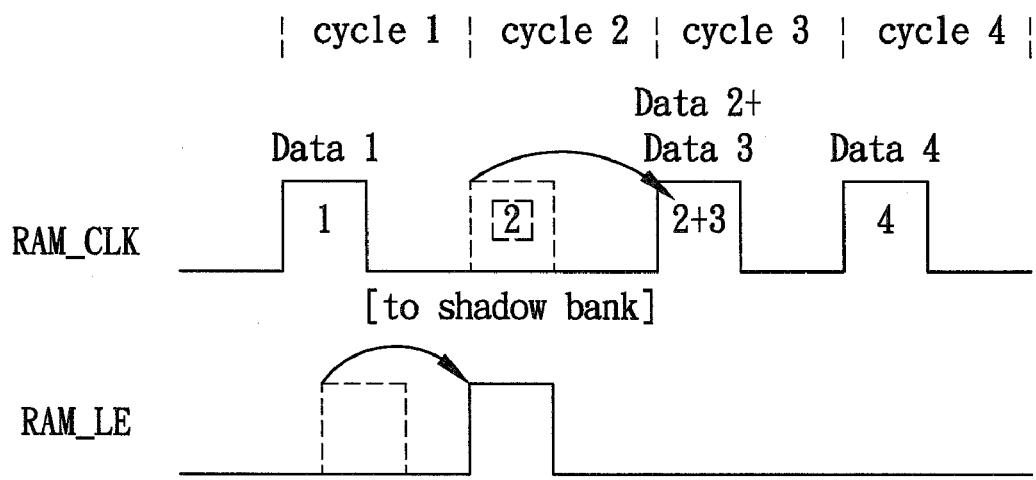
FIG. 3B shows an adjusted timing diagram, according to the embodiment, for resolving the request collision exemplified in FIG. 3A.

FIG. 3A shows an exemplary timing diagram illustrating a first case of request collision in the SRAM 100 of the embodiment. In the figure, a host sends external requests EXT_REQUEST to write data (that is, Data 1, Data 2, Data 3 and Data 4) in sequence to the SRAM 100 during respective cycles (that is, cycle 1, cycle 2, cycle 3 and cycle 4). Unfortunately, an internal request INT_RD also demands data during the same cycle 1. Accordingly, the internal request INT_RD collides with the external request EXT_REQUEST about the Data 1. In order to solve this problem, the sequencer 16 provides adjusted timing as shown in FIG. 3B, in which the signal RAM_CLK is derived from the external request EXT_REQUEST, and the signal RAM_LE is derived from the internal request INT_RD. After the Data 1 has been written to the first SRAM part 10A (through the first bus data_L) in cycle 1, the next cycle (that is, cycle 2) is reserved for the use of the internal request RAM_LE. At the same time, the Data 2 is written to the second shadow bank 12B under control of the signal SHADOW_CLK. In the following cycle 3, the Data 3 is directly written to the first SRAM part 10A (through the first bus data_L), and the Data 2 is transferred to the second SRAM part 10B from the second shadow bank 12B at the same time. All the other data (i.e., Data 4 and the following) will then be written during their respective expected duration. According to the embodiment, no postponement cycle is required in FIG. 3B to resolve the request collision, as compared to the required postponement cycle in FIG. 1B. As a result, no speed penalty is suffered in the embodiment of the present invention.

Figure 4A:
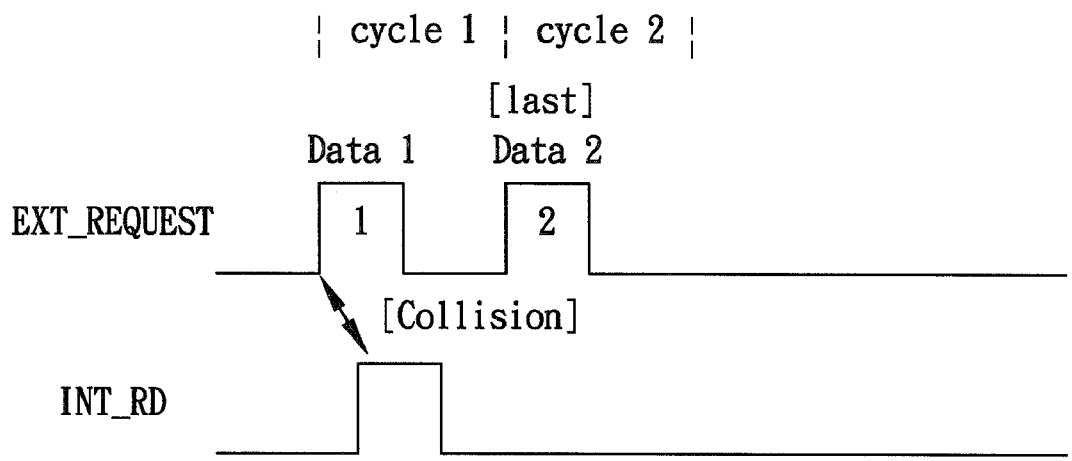
FIG. 4A shows an exemplary timing diagram illustrating a second case of request collision in the SRAM of the embodiment.
Figure 4B:
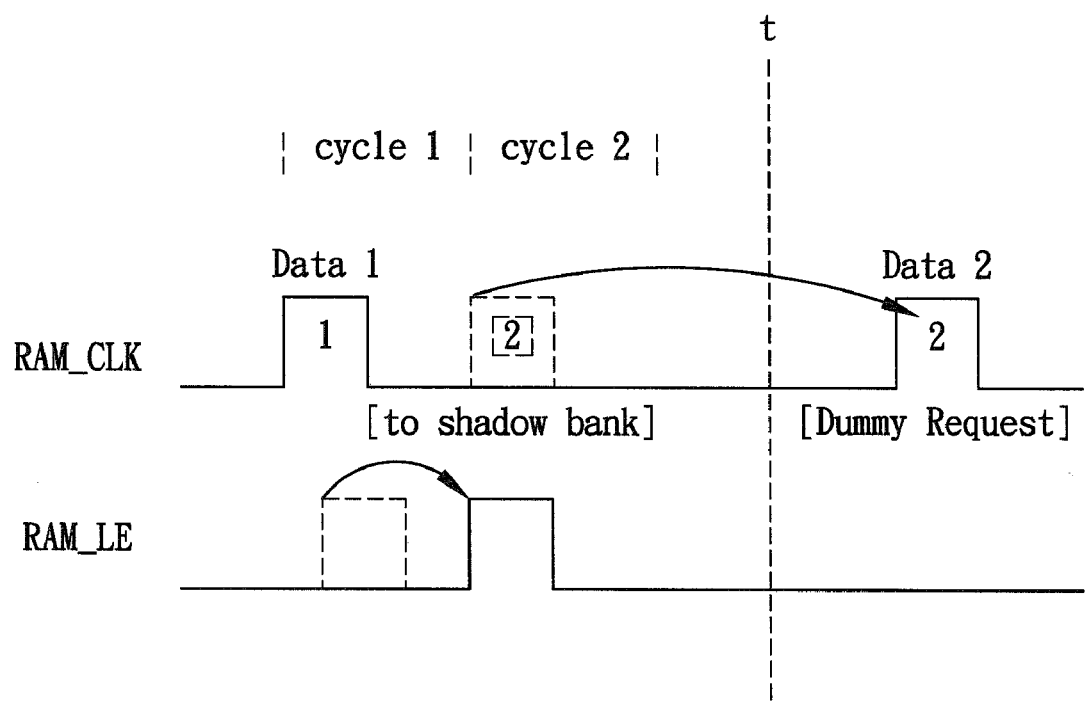
FIG. 4B shows an adjusted timing diagram, according to the embodiment, for resolving the request collision exemplified in FIG. 4A.

FIG. 4A shows an exemplary timing diagram illustrating a second case of request collision in the SRAM 100 of the embodiment. The timing is similar to that in FIG. 3A, except that the Data 2 is the last data without the following Data 3 or Data 4. FIG. 4B shows an adjusted timing diagram, according to the embodiment, for resolving the request collision exemplified in FIG. 4A. After the Data 2 is written to the second shadow bank 12B in cycle 2, the SRAM controller 14 generates a dummy request Dummy_Request_Enable, which causes the Data 2 to be transferred to the second SRAM part 10B from the second shadow bank 12B. Generally speaking, the dummy request Dummy_Request_Enable is generated at a time t when leaving a host request active window or leaving a memory access command. In the specification, the host request "active window" is determined and requested by the host to inform the SRAM 100 the required update area.

Figure 5A:
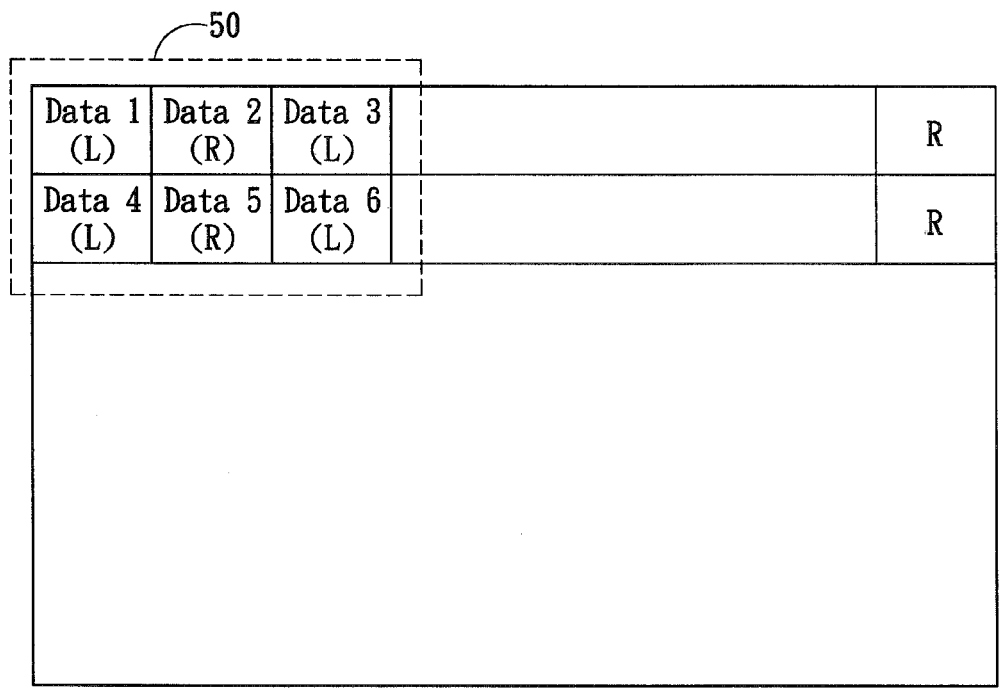
FIG. 5A shows an exemplary host request active window in a third case of request collision in the SRAM of the embodiment.
Figure 5B:
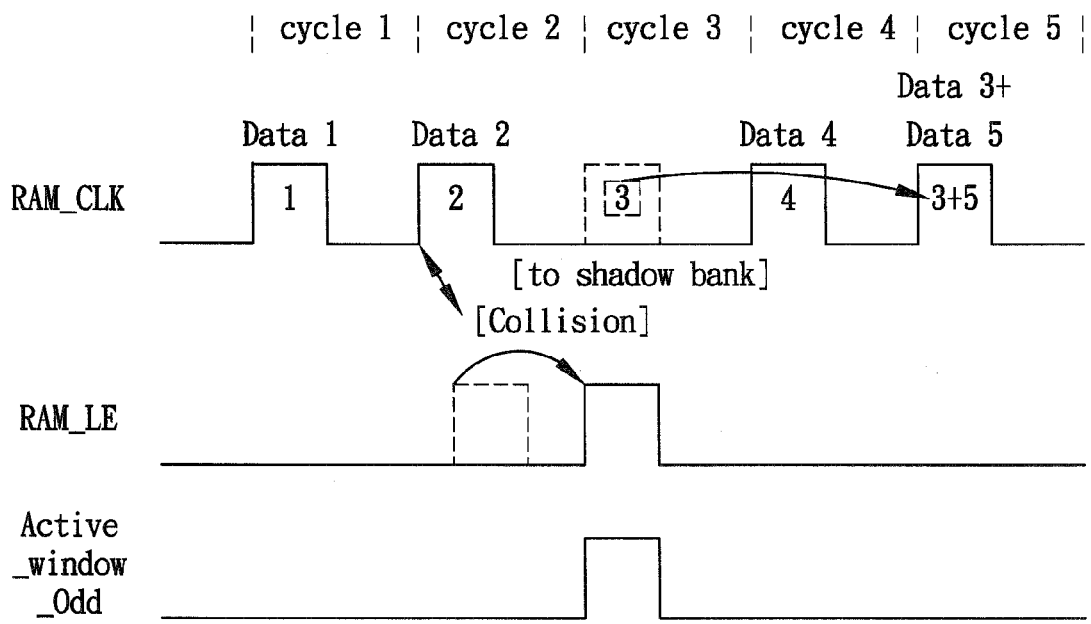
FIG. 5B shows an adjusted timing diagram, according to the embodiment, for resolving the request collision exemplified in FIG. 5A.

FIG. 5A shows an exemplary host request active window 50 in a third case of request collision in the SRAM 100 of the embodiment. The host request active window 50 is determined by the SRAM controller 14. In this case, the active window 50 ends at the odd data position. Specifically, both the last Data 3 in the first line and the first Data 4 in the second line of the active window 50 are associated with the same SRAM part, that is, the first SRAM part 10A. In the case that requests collide just before the Data 3, the Data 3 will be temporarily stored in the first shadow bank 12A during cycle 3. As the subsequent Data 4 is also associated with the first SRAM part 10A, the Data 3 and the Data 4 accordingly cannot be simultaneously written to the first SRAM part 10A. In order to solve this problem, as shown in the adjusted timing diagram of FIG. 5B, the Data 3 is kept in the first shadow bank 12A until two cycles later (i.e., cycle 5); at that time, the Data 3 is transferred to the first SRAM part 10A while the Data 5 is being written to the second SRAM part 10B. It is noted that the specific control on the odd-position Data 3 is performed under an asserted control signal Active_Window_Odd, which is generated by the SRAM controller 14.

Figure 6A:
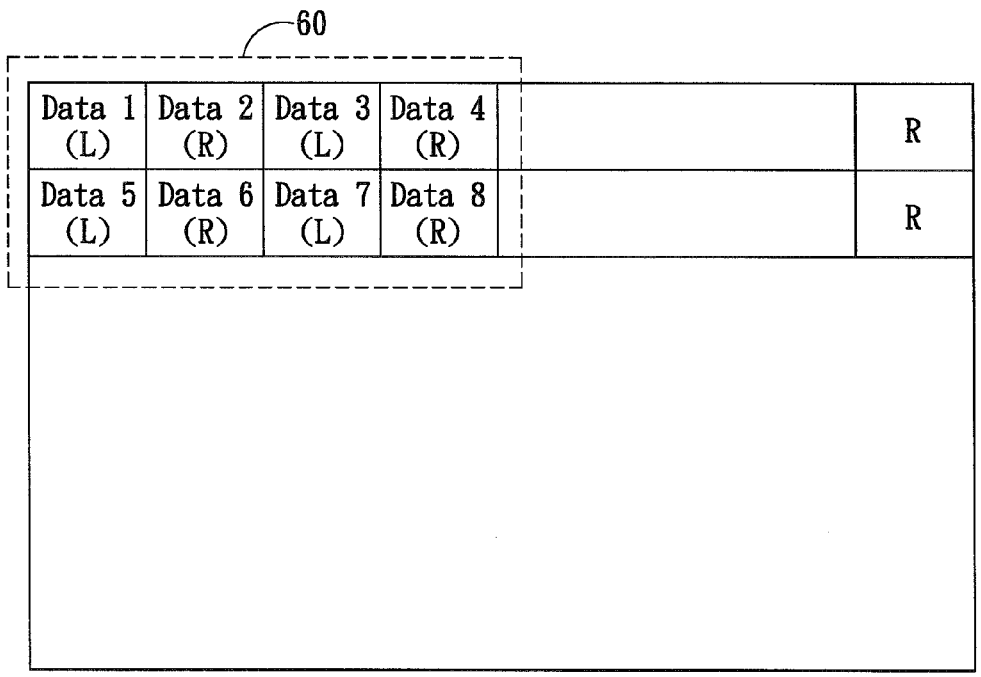
FIG. 6A shows an exemplary host request active window in a fourth case of request collision in the SRAM of the embodiment.
Figure 6B:
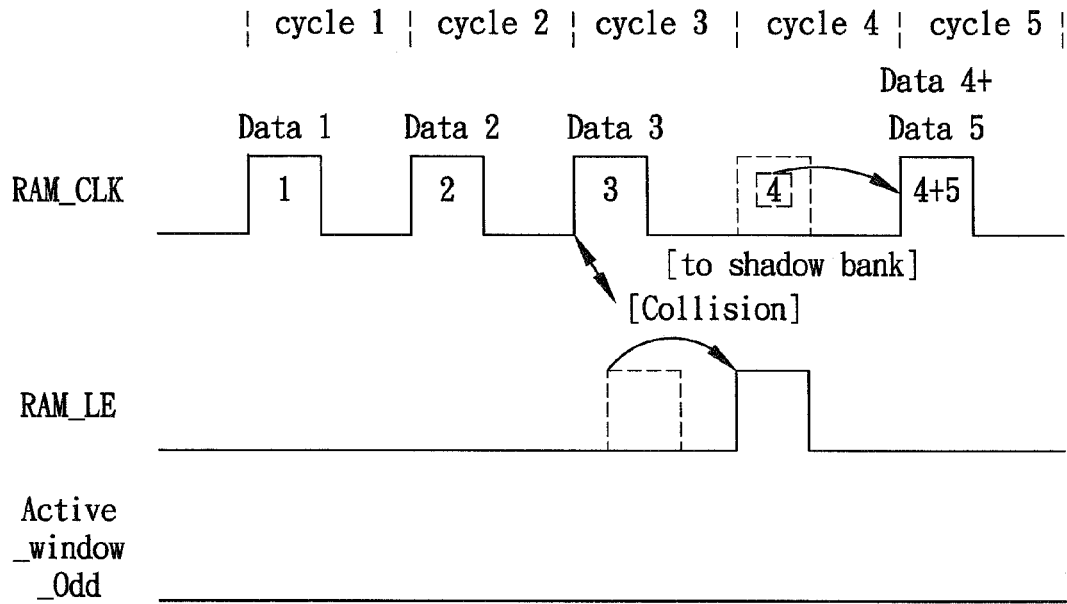
FIG. 6B shows an adjusted timing diagram, according to the embodiment, for resolving the request collision exemplified in FIG. 6A.

FIG. 6A shows an exemplary host request active window 60 in a fourth case of request collision in the SRAM 100 of the embodiment. In this case, the active window 60 ends at the even data position. Specifically, the last Data 4 in the first line and the first Data 5 in the second line of the active window 60 are associated with different SRAM parts, that is, the second SRAM part 10B and the first SRAM part 10A, respectively. In the case that requests collide just before the Data 4, the Data 4 will be temporarily stored in the second shadow bank 12B. As the subsequent Data 5 is associated with the first SRAM part 10A, the Data 4 and the Data 5 accordingly can be simultaneously transferred/written to the second SRAM part 10B and the first SRAM part 10A simultaneously, as shown in the timing diagram in FIG. 6B. It is noted that the specific control on the even-position Data 4 is performed under a de-asserted control signal Active_Window_Odd, which is generated by the SRAM controller 14.

According to the embodiment discussed above, no postponement cycle is required when request collision occurs. The data following the collision is temporarily stored in an associated shadow bank, the content of which is then transferred to the target SRAM part at a later time while the subsequent data is being written to the opposite SRAM part.

Although specific embodiments have been illustrated and described, it will be appreciated by those skilled in the art that various modifications may be made without departing from the scope of the present invention, which is intended to be limited solely by the appended claims.

What is claimed is:

1. A system for resolving request collision in a single-port static random access memory (SRAM), comprising:
   a first SRAM part and a second SRAM part, which are accessed in turn;
   a first shadow bank associated with the first SRAM part, and a second shadow bank associated with the second SRAM part, each for temporarily storing at least one piece of data and address;
   a SRAM controller, which generates control signals, for managing flow of data going to and from the single-port SRAM;
   a sequencer, which derives sequence signals based on the control signals of the SRAM controller, for controlling the first/second SRAM parts and the first/second shadow banks in a timed fashion;
   a first bus coupled to facilitate communication among the sequencer, the first SRAM part and the first shadow bank; and
   a second bus coupled to facilitate communication among the sequencer, the second SRAM part and the second shadow bank;
   wherein data is temporarily stored in the first or the second shadow bank associated with the first or the second SRAM part under access, when request collision occurs,
   wherein the temporarily stored data is then transferred, at a later time, to an associated one of the first/second SRAM parts while the other one of the first/second SRAM parts is being accessed; and
   wherein the SRAM controller is configured to determine an active window used to inform required update area to the single-port SRAM, a dummy request signal being generated by the SRAM controller when the request collision occurs and the data to be stored leaves the active window.

2. The system of claim 1, further comprising at least one latch, associated, with the first/second SRAM parts for reading and storing a whole line of display data from the first/second SRAM parts.

3. The system of claim 1, wherein the SRAM controller is configured to generate a dummy request for the temporarily stored data to be transferred to the associated, one of the first/second SRAM parts if the data is the last data.

4. The system of claim 1, wherein the system is configured for the sequencer to derive an external request signal for writing data to the first/second SRAM parts in accordance with an external request issued from a host.

5. The system of claim 4, wherein the system is configured, for an internal request to be issued from the host to the sequencer in order to demand display data.

6. The system of claim 1, wherein the active window ends at an odd, data position, and the temporarily stored data is kept for two cycles before being transferred.

7. The system of claim 1, wherein the active window ends at an even data position, and the temporarily stored, data is kept for one cycle before being transferred.

* * * * *